United States Patent [19]
Wicks et al.

[11] Patent Number: 6,128,475
[45] Date of Patent: Oct. 3, 2000

[54] WIRELESS TELEPHONE WITH SLIDING KEYBOARD

[75] Inventors: James E. Wicks, San Francisco, Calif.; Yutaka Hasegawa, Edgewater, N.J.

[73] Assignees: Sony Corporation, Tokyo, Japan; Sony Electronics, Inc., Park Ridge, N.J.

[21] Appl. No.: 08/826,733

[22] Filed: Apr. 4, 1997

[51] Int. Cl.⁷ .................................................... H04Q 7/32
[52] U.S. Cl. ............................ 455/90; 455/575; 455/550
[58] Field of Search .................................... 455/403, 564, 455/566, 550, 575, 90, 563, 556, FOR 103; 379/428, 433, 434, 368; D14/138, 140, 148, 137, 144, 100

[56] References Cited

U.S. PATENT DOCUMENTS

| | | |
|---|---|---|
| D. 298,035 | 10/1988 | Watanabe . |
| D. 298,243 | 10/1988 | Watanabe ............................... D14/138 |
| D. 319,234 | 8/1991 | Konno et al. . |
| D. 326,451 | 5/1992 | Roegner . |
| D. 328,070 | 7/1992 | Seay . |
| D. 336,472 | 6/1993 | Lin . |
| D. 337,764 | 7/1993 | Paton et al. . |
| D. 352,708 | 11/1994 | Rossi . |
| D. 356,085 | 3/1995 | Fellinger . |
| D. 369,796 | 5/1996 | Grewe . |
| D. 381,020 | 7/1997 | Harden et al. ......................... D14/138 |
| 4,739,128 | 4/1988 | Grisham ................................ 379/93.17 |
| 5,054,051 | 10/1991 | Hoff . |
| 5,151,946 | 9/1992 | Martensson ............................. 455/550 |
| 5,189,632 | 2/1993 | Paajanen ................................. 455/556 |
| 5,404,390 | 4/1995 | Tamura . |
| 5,436,954 | 7/1995 | Nishiyama et al. ..................... 455/550 |
| 5,450,619 | 9/1995 | Maeda .................................... 455/566 |
| 5,584,054 | 12/1996 | Tyneski et al. ........................... 455/90 |
| 5,596,487 | 1/1997 | Castameda et al. .................... 379/433 |
| 5,657,370 | 8/1997 | Tsugane et al. ........................ 379/433 |
| 5,677,949 | 10/1997 | Macor .................................... 379/433 |
| 5,715,524 | 2/1998 | Jambhekar et al. .................... 455/550 |
| 5,797,089 | 8/1998 | Nguyen .................................. 455/403 |

FOREIGN PATENT DOCUMENTS 3323858  1/1985  Germany .

Primary Examiner—William G. Trost
Assistant Examiner—Jean A. Gelin
Attorney, Agent, or Firm—Rader, Fishman & Grauer; Ronald P. Kananen

[57] ABSTRACT

An extension provided on a wireless telephone unit allows the unit to be compact while still providing an enhanced display, a keyboard, and a data input device. The keyboard is disposed on the extension which is slidable between a retracted and an extended position. When in the retracted position, the extension covers the data input device and most of the display. A single line of text remains uncovered for use when the extension is retracted. In the extended position, the extension uncovers a large display and data input device for use by the user.

17 Claims, 2 Drawing Sheets

WIRELESS TELEPHONE WITH SLIDING KEYBOARD

FIELD OF THE INVENTION

The present invention relates generally to the field of wireless telephony. Specifically, the present invention relates to a more compact and ergonomic means for providing an enhanced display, keyboard and input device for viewing and entering data on a wireless telephone unit.

BACKGROUND OF THE INVENTION

Since their introduction, wireless communication systems including pagers, cellular telephones and low-tier radio telephones, have become increasingly popular. Such devices provide an extremely convenient means of communication.

Wireless communication systems, particularly cellular telephones and low-tier radio telephones, are convenient because they allow their users to communicate from almost any location in a service area. Wireless phones also save time. For example, the user of a wireless telephone unit need not waste time looking for an available telephone in order to place a call.

A wireless telephone unit also allows its user to take advantage of time spent traveling. For example, with a wireless telephone, the user can be transacting business or making appointments while driving, riding or walking.

In order to fully utilize these advantages of wireless telephones, it should be convenient for the user to have the wireless telephone unit readily available at all times. In recognition of this fact, modern wireless telephones have become increasingly smaller and lighter to facilitate being carried by the user.

Moreover, a wireless telephone user who is walking or driving, may have only a single hand readily available to operate the wireless telephone unit. This consideration has lead to some attempts to design wireless telephone units that are easily operated with a single hand.

A typical wireless telephone may have a small liquid crystal display capable of displaying, for example, up to four lines of text. Using such a display, the user may scroll through stored data, such as a directory of telephone numbers, and select, for example, a number to be called. The display may also show a list of functions through which the user can scroll. When a function, such as speaker volume, is selected, the user can then input information or parameters to govern that function.

Accordingly, a wireless telephone unit with a sufficiently large display can be readily programmed and adapted to provide many features and functions that would not otherwise be available. However, as may be appreciated, the goal of providing a large, versatile, easily read display on a wireless telephone unit is at odds with the goal of providing a compact unit. Additionally to fully utilize an enhanced display some means of controlling a cursor on the display, causing the display to scroll, and selecting data items displayed must be provided. This further frustrates the goal of a compact wireless phone unit.

Accordingly, there is a need for an improved wireless telephone unit that is both compact and ergonomic, but which also provides a large, versatile, easily read display and a means of entering and manipulating data on the display.

OBJECTS OF THE INVENTION

Accordingly it is an object of the present invention to meet the above-described needs and others. It is also an object of the present invention to provide a wireless telephone unit which is compact and ergonomic and has a large, versatile, easily read display.

More particularly, it is an object of the present invention to provide a wireless telephone with a data input device which can augment the standard keyboard as a means for entering and manipulating data on the display of a wireless telephone unit.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a wireless telephone unit having: a display; an extension slidable between a first retracted position and a second extended position; and a keyboard disposed on the extension.

The extension, when in the first retracted position, covers at least a portion of the display. In one example, the extension covers all of the display except a single line of text.

The wireless telephone unit of the present invention may also have a data input device. The data input device may be covered by the extension when the extension is in the first retracted position and may be exposed when the extension is in the second extended position. The data input device may be a joystick, trackball or the like.

The present invention also encompasses a method of making a wireless telephone unit by: providing a display on the unit; mounting an extension on the unit which is slidable between a first retracted position and a second extended position; and disposing a keyboard on the extension.

The method may continue by covering at least a portion of the display with the extension when the extension is in the first retracted position. In one example, the method includes covering all of the display, except a single line of text, with the extension when the extension is in the first retracted position.

The method may continue by providing a data input device on the unit, and covering the data input device with the extension when the extension is in the first retracted position or exposing the data input device when the extension is in the second extended position. Again, the data input device may be a joystick, trackball or the like.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENT

According to the principles of the present invention, a compact wireless telephone unit having an enhanced display for accomplishing the above described objects and others is provided.

Figure 1:
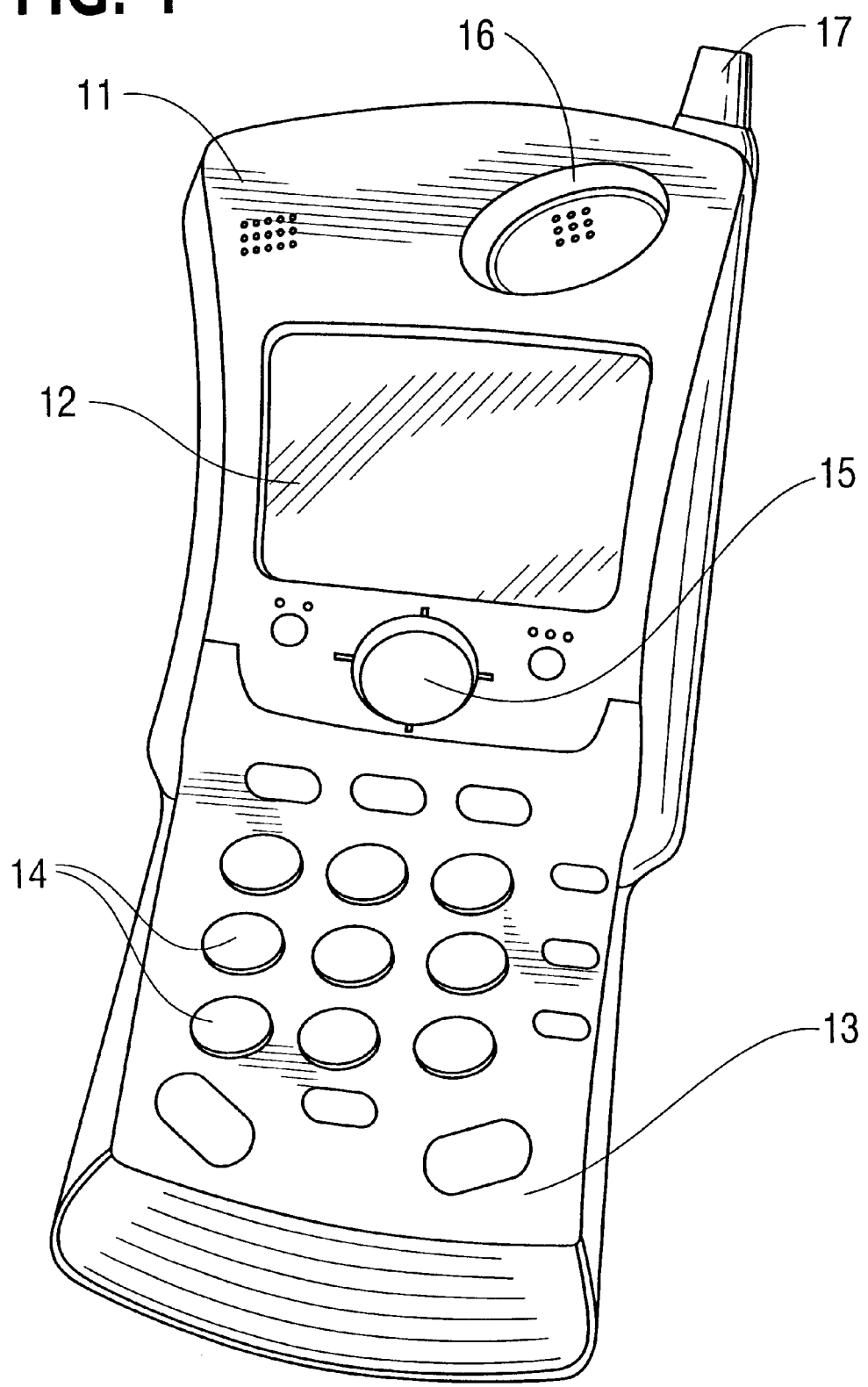
FIG. 1 illustrates a wireless telephone unit of the present invention with a sliding keyboard in an extended position.

As shown in FIG. 1, the wireless telephone unit 11 of the present invention has a speaker 16, a display 12, e.g., a liquid crystal display, an antenna 17 and a keyboard 14. To further enhance the compactness of the unit 11, the keyboard 14 is provided on an extension 13 which can slide between an extended position and a retracted position.

Figure 3:
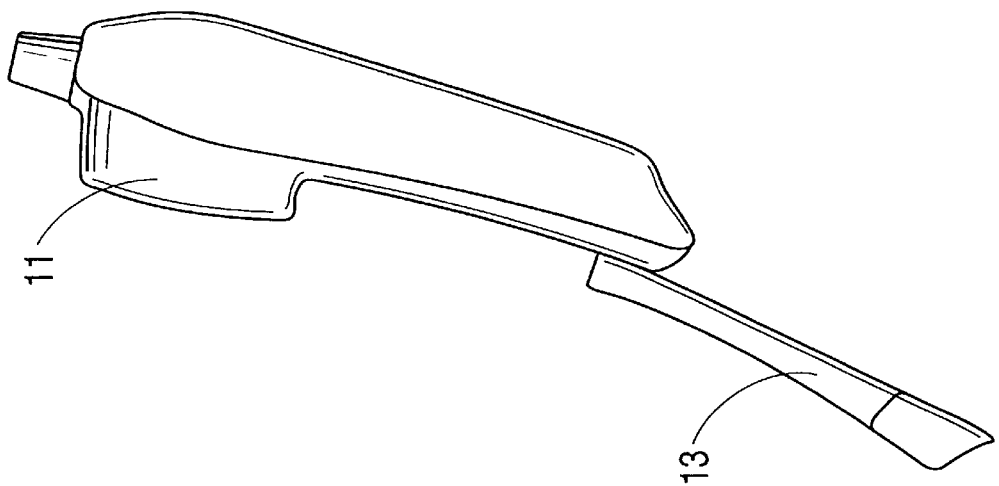
FIG. 3 illustrates a side view of a wireless telephone unit of the present invention with a sliding keyboard in an extended position.

As shown in FIG. 1, the extension 13 is in the extended position. FIG. 3 shows a side view of the wireless telephone unit 11 with the extension 13 in the extended position.

Figure 2:
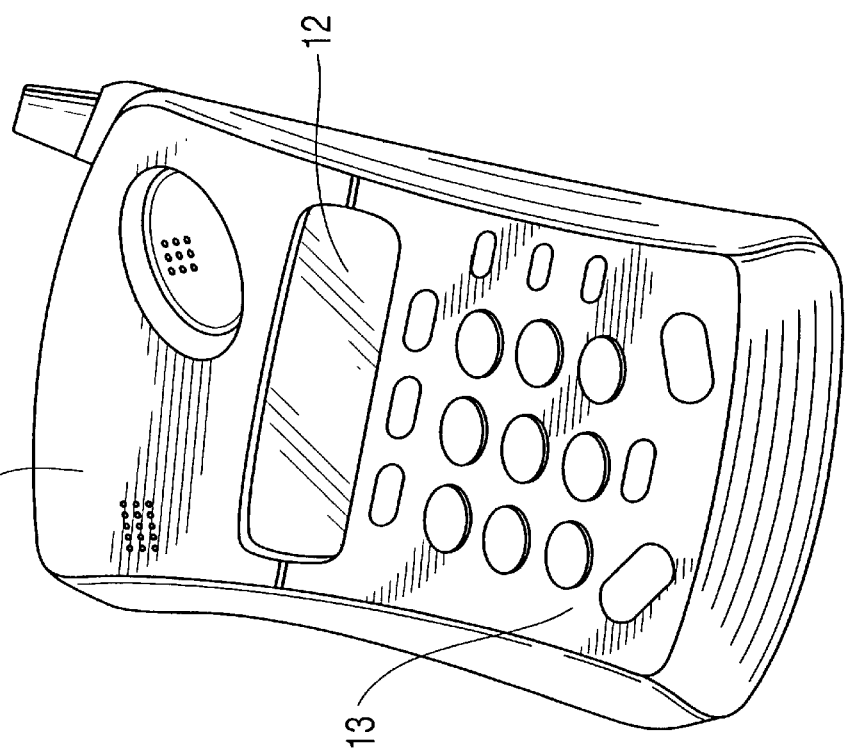
FIG. 2 illustrates a wireless telephone unit of the present invention with a sliding keyboard in a retracted position.

In contrast, FIG. 2 shows the extension 13 in the retracted position. As can be seen in FIG. 2, when the extension 13 is in the retracted position, it covers a significant portion of the display 12. If display 12 provides four lines of text, for example, only the first line of text may remain uncovered when the extension 13 is in the retracted position.

When extension 13 is in the retracted position, the wireless telephone unit 11 is more compact and easily carried. The keyboard on extension 13, however, remains accessible, and the user may place a call by dialling a phone number using the keyboard. In this example, the single line of text of display 12 which remains visible may be used to display the number being dialled so that the user can see that the number has been entered correctly before the call is placed or the connection made. This may be all the functionality that a wireless telephone user requires a majority of the time.

However, with a larger display, the wireless telephone unit may provide expanded functions for the user. For example, the unit 11 may store a directory of telephone numbers and addresses which can be referenced. Such a directory is obviously better viewed on a larger display. The unit 11 may also provide a directory of parameters that can be controlled by the user, such as speaker volume. Again, such a directory when accessed is better viewed on a larger display.

In those occasional instances when a larger display is helpful, the extension 13 may be moved to the extended position as shown in FIG. 1. With the full display 12 exposed, more text and/or graphics may be displayed to provide additional functions for the user.

As shown in FIG. 1, sliding the extension 13 to the extended position may also expose an additional data input device 15 which can be used to manipulate data or a cursor on the display 12. Input device 15 may be a variety of equivalent input devices such as a trackball or a short joystick.

In the example of input device 15 being a short joystick, the joystick 15 is preferably short and thick so as to be easily operated by the thumb or a single finger of a user. The upper surface of the joystick 15 may be indented to facilitate movement of the joystick 15 with a user's thumb or finger. The joystick 15 is biased in an upright position, but may be displaced in any direction. In the upright position, the short shaft of the joystick 15 is substantially perpendicular to the plane of the display 12.

A cursor on the display 12 may move in response to the displacement of the joystick 15. In this way, the user may move a cursor to highlight a displayed data item which the user wishes to select, e.g. a phone number from a directory that the user wished to call.

Once highlighted, the data item is selected by the user. In the preferred embodiment, this selection is accomplished by pressing the joystick 15 down into the unit 11 to actuate a selection button disposed under the joystick 15 and internal to the unit 11. This allows the user to highlight and select a data item without removing a thumb or finger from the joystick 15. Alternatively, the selection may be accomplished by pressing a selection button disposed at the side of joystick 15.

The example of input device 15 being a trackball is similar. A cursor is moved on the screen in response to movement of the trackball 15. When a data item is highlighted, the data may be selected by pressing trackball 15 into the unit 11 to actuate a selection button under the trackball. Alternatively, a selection button may be disposed at the side of the trackball 15.

In the case of either a joystick, trackball or the like, the display 12 may be made to display the alphabet. The letters of the alphabet may then be sequentially highlighted and selected using the data input device 15 as described to input data to the wireless telephone unit 11.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A wireless telephone unit comprising:
   a face portion of said wireless telephone unit which comprises a speaker and a keypad, wherein said face portion lies substantially in a common plane;
   a display device disposed on said face of said unit;
   an extension on said face of said unit which is slidable between a first fully retracted position and a second fully extended position in a direction parallel to said plane of said face portion; and
   a data input device;
   wherein said keypad is disposed on said extension;
   wherein said extension, when fully retracted into said retracted position, covers only a portion of said display; and
   wherein said data input device is a joystick.

2. A wireless telephone unit as claimed in claim 1, wherein an uncovered portion of said display extends beyond an outer edge of said extension when said extension is in said fully retracted position.

3. A wireless telephone unit as claimed in claim 1, wherein said data input device is covered by said extension when said extension is in said first retracted position and is exposed when said extension is in said second extended position.

4. A wireless telephone unit as claimed in claim 1, wherein said extension further comprises a window formed therein through which a portion of said display can be seen when said extension is in said fully retracted position.

5. A wireless telephone unit comprising:
   a face portion of said wireless telephone unit which comprises a speaker and a keypad, wherein said face portion lies substantially in a common plane;
   a display device disposed on said face of said unit;
   an extension on said face of said unit which is slidable between a first fully retracted position and a second fully extended position in a direction parallel to said plane of said face portion; and
   a data input device;
   wherein said keypad is disposed on said extension;

wherein said extension, when fully retracted into said retracted position, covers only a portion of said display; and wherein said data input device is a trackball.

6. A wireless telephone unit as claimed in claim 5, wherein an uncovered portion of said display extends beyond an outer edge of said extension when said extension is in said fully retracted position.

7. A wireless telephone unit as claimed in claim 5, wherein said data input device is covered by said extension when said extension is in said first retracted position and is exposed when said extension is in said second extended position.

8. A wireless telephone unit as claimed in claim 5, wherein said extension further comprises a window formed therein through which a portion of said display can be seen when said extension is in said fully retracted position.

9. A method of making a wireless telephone unit comprising:

providing, a speaker and a keypad on a face of said telephone unit, said face being defined substantially within a common plane;

providing a display on said face of said unit;

mounting an extension on said face of said unit which is slidable between a first fully retracted position and a second fully extended position in a direction parallel to said plane of said face;

disposing said keypad on said extension;

covering only a portion of said display with said extension when said extension is in said fully retracted position; and providing a data input device on said unit;

wherein said data input device is a joystick.

10. A method as claimed in claim 9, wherein said covering comprises covering all of said display, except a single line of text, with said extension when said extension is in said fully retracted position.

11. A method of making a wireless telephone unit comprising:

providing, a speaker and a keypad on a face of said telephone unit, said face being defined substantially within a common plane;

providing a display on said face of said unit;

mounting an extension on said face of said unit which is slidable between a first fully retracted position and a second fully extended position in a direction parallel to said plane of said face;

disposing said keypad on said extension;

covering only a portion of said display with said extension when said extension is in said fully retracted position; and providing a data input device on said unit;

wherein said data input device is a trackball.

12. A method as claimed in claim 11, wherein said covering comprises covering all of said display, except a single line of text, with said extension when said extension is in said fully retracted position.

13. A wireless telephone unit comprising:

a display device disposed on a body of said unit;

an extension slidable relative to said body between a first retracted position and a second extended position;

a keyboard disposed on said extension; and a data input device which is disposed on said body of said unit so as to be covered by said extension when said extension is in said first retracted position and exposed when said extension is in said second extended position;

wherein said data input device comprises either of a joystick or a trackball.

14. A wireless telephone unit as claimed in claim 13, wherein said extension, when fully retracted into said retracted position, covers a portion of said display.

15. A wireless telephone unit as claimed in claim 14, wherein an uncovered portion of said display extends beyond an outer edge of said extension when said extension is in said fully retracted position.

16. A wireless telephone unit as claimed in claim 13, wherein said data input device is a joystick.

17. A wireless telephone unit as claimed in claim 13, wherein said data input device is a trackball.

* * * * *